United States Patent
Takeuchi et al.

(10) Patent No.: US 7,464,604 B2
(45) Date of Patent: Dec. 16, 2008

(54) PRESSURE SENSOR AND ATTACHING MECHANISM THEREOF

(75) Inventors: Hisayuki Takeuchi, Oobu (JP); Inao Toyoda, Anjo (JP); Hiroshige Matsui, Aichi-ken (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/905,523

(22) Filed: Oct. 2, 2007

(65) Prior Publication Data

US 2008/0083283 A1  Apr. 10, 2008

(30) Foreign Application Priority Data

Oct. 4, 2006  (JP)  ............... 2006-272609

(51) Int. Cl.
*B23Q 17/00* (2006.01)
(52) U.S. Cl. ............................................. 73/756
(58) Field of Classification Search ............... 73/756
See application file for complete search history.

(56) References Cited

U.S. PATENT DOCUMENTS

2006/0090566 A1*  5/2006  Oda .......................... 73/715
2006/0162141 A1*  7/2006  Takeuchi ................. 29/407.07
2007/0113660 A1*  5/2007  Matsui ....................... 73/715
2008/0053237 A1*  3/2008  Matsui et al. ............. 73/756

FOREIGN PATENT DOCUMENTS

| JP | H02-206738 | 8/1990 |
| JP | H04-116437 | 4/1992 |
| JP | H05-034231 | 2/1993 |
| JP | 2004-286617 | 10/2004 |

* cited by examiner

*Primary Examiner*—Andre Allen
(74) *Attorney, Agent, or Firm*—Posz Law Group, PLC

(57) ABSTRACT

A pressure sensor is attached to an engine by inserting a cylindrical metal case having a hollow part into an attaching hole formed in the engine in which engine oil flows. An oil passage is formed in the cylindrical metal case, and oil passages are formed in the housing. The pressure sensor is connected to the engine through an oil transmitting pipe and an oil returning pipe in order to radiate thermal energy of a pressure sensing diaphragm and a pressure sensing chip by flowing the engine oil from the engine to the hollow part of the metal case and by returning the engine oil from the hollow part to the engine.

13 Claims, 2 Drawing Sheets

PRESSURE SENSOR AND ATTACHING MECHANISM THEREOF

CROSS-REFERENCE TO RELATED APPLICATIONS

This application is related to and claims priority from Japanese Patent Application No. 2006-272609 filed on Oct. 4, 2006, the contents of which are hereby incorporated by reference.

BACKGROUND OF THE INVENTION

1. Field of the Invention

The present invention relates to a pressure sensor and an attaching mechanism for attaching the pressure sensor to an attaching member such as an internal combustion engine of a vehicle. For example, the pressure sensor according to the present invention is applicable to a combustion pressure sensor capable of detecting a combustion pressure of an internal combustion engine mounted on a vehicle. The pressure sensor according to the present invention is composed of a pressure sensing diaphragm, a pressure sensing chip, and a pressure transmission member, and capable of detecting a pressure received by the pressure sensing diaphragm and transferred from the pressure sensing diaphragm to the pressure sensing chip through the pressure transmission member.

2. Description of the Related Art

Related art techniques, for example, Japanese patent laid open publication No. JP H5-34231 has proposed and disclosed a pressure sensor composed of a pressure sensing diaphragm, a sensing unit such as a pressure sensing chip, and a pressure transmission member in which the pressure sensing diaphragm is placed in one end of a hollow cylindrical metal case, the pressure transmission member is placed in a hollow part of the hollow cylindrical metal case, and the pressure sensing chip is placed at the other end of the hollow cylindrical metal case. The pressure sensing diaphragm is deformed by receiving the pressure.

Such a type of the pressure sensor is applied to a combustion pressure sensor for vehicles. In a concrete example, the hollow cylindrical metal case is inserted into an attaching hole formed in an internal combustion engine of a vehicle, and fixed to the internal combustion engine. In this example, the internal combustion engine acts as an attaching member. The pressure sensing diaphragm receives a pressure (or a chamber pressure) of the internal combustion engine, namely, receives a combustion pressure in a combustion chamber of the internal combustion engine. The sensing unit such as a pressure sensing chip receives the signal of the received pressure transferred from the pressure sensing diaphragm through the pressure transmission member.

There is a possibility to expose the pressure sensing diaphragm and the pressure sensing chip, which are main components of the combustion pressure sensor, to a measuring atmosphere at a high temperature. Such a type of the related art pressure sensor having the configuration described above is attached to the attaching member by inserting and fixing the hollow cylindrical metal case into the attaching hole of the attaching member. Because the hollow cylindrical metal case is completely surrounded by the attaching hole, the thermal energy transmitted from the internal combustion engine can not be radiated. When the thermal energy is applied to the pressure sensing diaphragm under an actual measuring condition, there is a possibility of generating a strain in the pressure sensing diaphragm by receiving the thermal energy. The thermal energy increases the temperature of the pressure sensing unit such as the pressure sensing chip, so that the temperature of a pressure sensing unit exceeds its own operation allowable temperature. Finally, the pressure sensing chip falls to operation failure.

For example, in case of the combustion pressure sensor, highly thermal energy generated by a combustion chamber or cylinders is directly supplied to the pressure sensing diaphragm and the pressure sensing chip, the strain of the pressure sensing diaphragm and the operation failure of the pressure sensing chip easily caused. Such strain and operation failure causes detection errors of the pressure sensor. As a result, pressure sensor generates a large magnitude of detection error.

SUMMARY OF THE INVENTION

It is an object of the present invention to provide a pressure sensor capable of decreasing the temperature of a pressure sensing diaphragm and a pressure sensing unit forming the pressure sensor, in which a pressure received by the pressure sensing diaphragm is transferred to the pressure sensing unit through a pressure transmission member in order to detect the pressure.

To achieve the above purposes, the present invention provides a pressure sensor composed mainly of a hollow cylindrical metal case, a pressure sensing diaphragm, a pressure sensing unit, and a pressure transmission member. In particular, an oil passage through which oil flows is formed in a hollow part of the hollow cylindrical metal case in order to radiate thermal energy of the pressure sensing diaphragm and the pressure sensing unit.

Flowing the oil through the oil passage formed in the hollow part of the hollow cylindrical metal case can radiate the thermal energy of the pressure sensing diaphragm and the pressure sensing unit, and can thereby decrease the temperature of the pressure sensing diaphragm and the pressure sensing unit, efficiently.

The oil passage in the pressure sensor of the present invention is composed mainly of a primary passage and a secondary passage. Those primary and secondary passages are formed in the side wall part of the hollow cylindrical metal case and joined to the hollow part of the hollow cylindrical metal case. The oil flows from the primary passage to the secondary passage.

When the hollow cylindrical metal case is attached to an attaching member in which the oil flows, the oil is introduced from the attaching member to the hollow part through the primary passage of the hollow cylindrical metal case, and the oil is then returned from the hollow part to the attaching member through the secondary passage of the hollow cylindrical metal case. This configuration enables the attaching member such as an internal combustion engine of a vehicle to be an oil supply source for the pressure sensor.

When the pressure sensor has the configuration in which the hollow cylindrical metal case is attached to a housing at the other end part of the hollow cylindrical metal case and the hollow cylindrical metal case is fixed to the attaching member through the housing, it is possible to have a configuration in which an introduction passage and an discharge passage are formed in the housing, in which the oil is introduced to the primary passage through the introduction passage and the oil is discharged from the secondary passage to the attaching member through the discharge passage. In this configuration, the oil can be supplied from the attaching member to the primary passage of the hollow cylindrical metal case through the introduction passage of the housing, and the oil can be returned from the secondary passage of the hollow cylindrical metal case to the attaching member through the discharge passage of the housing.

It is preferred to form a filter at an upstream side of the oil passage. This filter is capable of filtering the oil before the oil flows into the hollow part of the hollow cylindrical metal case. The presence of the filter can prevent the invasion of foreign matters such as dust, metal powder and fine chippings into the hollow part of the hollow cylindrical metal case. In particular, it is preferred to add such a filter into the oil passage composed mainly of the primary passage and the secondary passage.

Another aspect of the present invention provides an attaching mechanism of a pressure sensor in which the hollow cylindrical metal case of the pressure sensor is inserted into an attaching hole formed in an attaching member in which the oil flows in order to attach the pressure sensor to the attaching member.

In the attaching mechanism according to the present invention, the oil passage, through which the oil flows, is formed in the hollow cylindrical metal case, and the pressure sensor is joined to the attaching member through an oil transmitting pipe member and an oil returning pipe member. The oil is transmitted to the oil passage through the oil transmitting pipe member, and the oil is returned from the oil passage to the attaching member through the oil returning pipe member. The oil in the attaching member is supplied to the hollow part of the hollow cylindrical metal case through those passages and the pipe members, and the oil in the hollow part of the hollow cylindrical metal case is returned to the attaching member through those passages and the pipe members in order to radiate the thermal energy of the pressure sensing diaphragm and the pressure sensing unit.

Because the thermal energy of the pressure sensing diaphragm and the pressure sensing unit is radiated by the oil flowing which flows in the attaching member into the hollow part of the hollow cylindrical metal case through the oil passage, it is possible to efficiently decrease the temperature of the pressure sensing diaphragm and the pressure sensing unit in the pressure sensor.

In the attaching mechanism having the above configuration, it is possible to have the configuration in which the oil passage has the primary passage and the secondary passage, and the oil is introduced into the hollow part of the hollow cylindrical metal case through the primary passage and then discharged from the hollow part through the secondary passage.

Further, in the attaching mechanism described above, it is possible to have the configuration in which the hollow cylindrical metal case is fixed to the housing at the other end of the hollow cylindrical metal case, and the pressure sensor is attached to the attaching member through the housing, the oil transmitting pipe member and the oil returning pipe member are joined between the housing and the attaching member, and the housing has an introduction passage and a discharge passage, in which the introduction passage is connected between the oil transmitting pipe member and the primary passage, and the discharge passage is connected between the secondary passage and the oil returning pipe member.

This configuration enables the oil to flow between the oil passage of the hollow cylindrical metal case and the attaching member through the introduction passage and the discharge passage of the housing.

Still further, the attaching mechanism described above has a filter, capable of filtering the oil before the oil reaches the hollow part of the hollow cylindrical metal case, is placed at an upstream side of the oil passage. It is thereby possible to prevent the invasion of dust and metal powder in the oil W before supplying it to the hollow part of the hollow cylindrical metal case.

Moreover, in the pressure sensor and the attaching mechanism according to the present invention, it is possible to use engine oil of a vehicle as the oil when the attaching member is an internal combustion engine of a vehicle.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
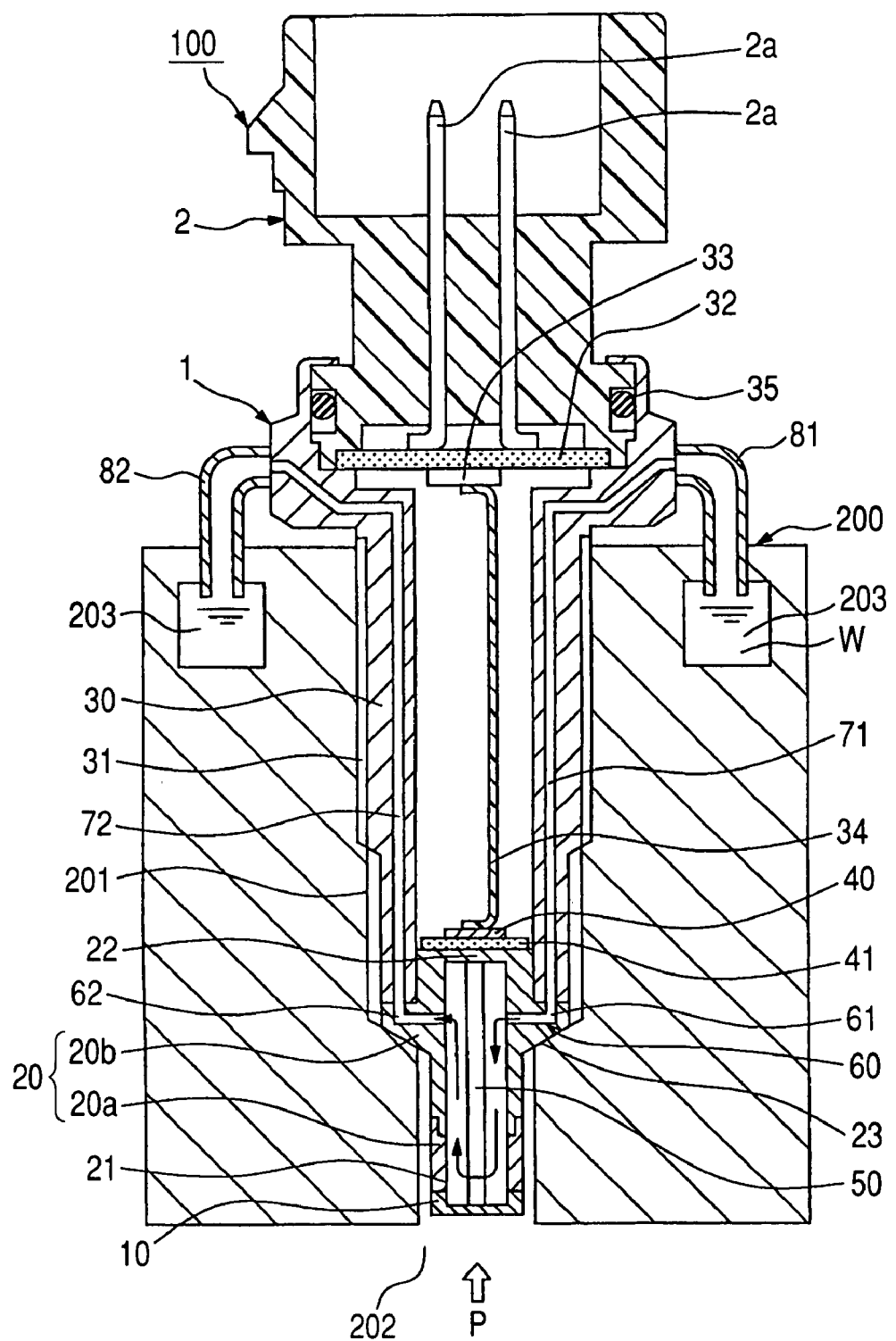
FIG. 1 is a schematic view showing an attaching mechanism and a pressure sensor according to a first embodiment of the present invention to be attached to an internal combustion engine of a vehicle.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the pressure sensor according to a first embodiment of the present invention with reference to FIG. 1.

FIG. 1 is a schematic view showing an attaching mechanism of the pressure sensor 100 according to the first embodiment of the present invention to be attached to an internal combustion engine 200 of a vehicle.

The pressure sensor 100 is attached to the engine 200 of a vehicle and acts as a combustion pressure sensor capable of detecting a pressure in a combustion chamber 202 of the engine 200. FIG. 1 shows only a head part of the engine 200.

The pressure sensor 100 is composed mainly of a body unit 1 and a connector unit 2 connected to the body unit 1.

An internal combustion engine of a vehicle has an attaching hole (or a fitting hole) to which the pressure sensor 100 is attached. As shown in FIG. 1, a part of a body part 1 of the pressure sensor 100 is inserted from the bottom end part of the pressure sensor 100 into the attaching hole 201. One end of the body part 1 of the pressure sensor 100 is exposed to the combustion chamber 202 of the engine 200.

In the first embodiment, the body part 1 of the pressure sensor 100 is composed mainly of a pressure sensing diaphragm 10, a hollow cylindrical metal case 20, and a cylindrical housing 30 which are assembled in one body, namely, sequentially connected by welding, soldering, and adhesion. The pressure sensing diaphragm 10 acts as a receiving pressure part capable of receiving a pressure from the internal combustion engine (as the attaching member) through the end part of the body part 1. A connector part 2 is connected to the other end of the body part 1, namely, to the cylindrical housing 30.

The cylindrical housing 30 is made of metal such as stainless. An attachment part 31 is formed on the outer surface of the cylindrical housing 30 in order to fix the pressure sensor 100 to the engine 200 (as the attaching member) through the attaching hole 201 thereof.

The attachment part 31 is composed of a screw part 31 to be screwed to the attaching hole 201. On the other hand, a screw part corresponding to the screw part 31 is formed in the inner surface of the attaching hole 201. Thus, the pressure sensor 100 of the first embodiment is fixed to the engine 200 (as the attaching member) by screwing the screw part 31 to the attaching hole 201.

The hollow cylindrical metal case 20 is made of metal such as stainless of a hollow cylindrical shape. In the configuration of the first embodiment, the hollow cylindrical metal case 20 is composed of a primary case part 20a having a bottom and a secondary case part 20b of a cylindrical shape positioned at the housing 30 side. The bottom of the primary case part 20a is placed in the combustion chamber 202 of the engine 200.

The entire circumferences of the primary case part 20a and the secondary case part 20b are connected by welding. The end part of the metal case 20 positioned at the combustion chamber 202 is opening. The other end of the metal case 20 positioned at the cylindrical housing 30 side is a distortion part 22.

When the internal combustion engine 200 applies a pressure P to the pressure sensing diaphragm 10, the pressure P is transmitted to the distortion part 22 through a pressure transmission mechanism (described later in detail). The distortion part 22 of the metal case 20 is thereby distorted. The distortion part 22 is equipped with a pressure sensing chip 40. This pressure sensing chip 40 acts as a pressure sensing unit capable of generating the detection signal based on the magnitude of distortion of the distortion part 22 caused by the pressure P. In the first embodiment, the pressure sensing chip 40 is connected to the outer surface of the distortion part 22 by the manner of glass connection with low melting glass.

The pressure sensing chip 40 forms a distortion gage composed of a diffusion resistance on a semiconductor chip. The gage circuit forms a bridge circuit. In the pressure sensing chip 40, the bridge circuit outputs a signal based on the magnitude of distortion of the pressure sensing chip 40.

A seal surface 23 is formed around the entire circumference of the secondary case part 20b of the hollow cylindrical metal case 20. As shown in FIG. 1, the seal surface 23 has a tapered surface expanding toward the connector part 2 from the combustion chamber 202.

The pressure sensing diaphragm 10 is connected to an opening part 21 positioned at the end part of the combustion chamber 202 in the hollow cylindrical metal case 20 so that the pressure sensing diaphragm 10 covers the opening part 21. The pressure sensing diaphragm 10 has a circular disk shape made of metal such as stainless, and connected to the opening part 21 of the hollow cylindrical metal case 20 by welding.

On attaching the pressure sensor 100 having the above configuration to the internal combustion engine 200 of the vehicle, the pressure P of the internal combustion engine 200 is applied to the pressure sensing diaphragm 10, as clearly shown in FIG. 1 by the outline arrow P. The pressure sensing diaphragm 10 is distorted and deformed by the pressure P.

A pressure transmission member 50 is placed in the hollow part of the hollow cylindrical metal case 20. The pressure transmission member 50 is made of metal such as stainless or ceramics. In the configuration of the first embodiment of the present invention, the pressure transmission member 50 has a rectangle shape.

The end parts of the pressure transmission member 50 are contacted to the inner surface of the distortion part 22 and the pressure sensing diaphragm 10 of the hollow cylindrical metal case 20, respectively so that the pressure transmission member 50 presses them. The pressure P supplied from the internal combustion engine 200 is transmitted from pressure sensing diaphragm 10 to the distortion part 22 of the hollow cylindrical metal case 20 through the pressure transmission member 50.

In the configuration of the pressure sensor 100 of the first embodiment having the pressure detection mechanism described above, the pressure P received by the pressure sensing diaphragm 10 is transmitted to the distortion part 22 of the hollow cylindrical metal case 20, and the pressure sensing chip 40 generates and outputs the detection signal based on the magnitude of distortion in the distortion part 22.

As shown in FIG. 1, a printed wiring board 32 made mainly of a ceramic substrate in the inside of the cylindrical housing 30. An IC chip 33 is mounted on the printed wiring board 32 and electrically connected to the printed wiring board 32 through bonding wires (not shown). In the IC chip 33, various circuits are formed in order to amplitude and adjust the output transferred from the pressure sensing chip 40.

As shown in FIG. 1, the IC chip 33 is electrically connected to the pressure sensing chip 40 through wiring members 34 made of lead wirings and a flexible printed circuit (FPC).

The connector part 2 is connected to the cylindrical housing 30 through an O-ring 35. The connector part 2 is made of resin such as PPS resin (Polyphenylene sulfide resin). The connector part 2 and metal terminals 2a are assembled in one body by insert molding.

One end of the connector part 2 is inserted into another opening of the housing 2 opposed to the opening thereof through which the metal case 20 is inserted. The connector part 2 and the cylindrical housing 30 are assembled in one body by caulking the edge part of the housing 30 and the connector part 2 together.

The terminals 2a of the connector part 2 are electrically connected to the printed wiring board 32 in the cylindrical housing 30. The terminals 2a are electrically connectable to an EUC (electric control unit, not shown) mounted on a vehicle. This configuration enables the pressure sensor 100 to transfer/receive various signals to/from outside devices (not shown).

In the pressure sensor 100 according to the first embodiment of the present invention, the pressure sensing diaphragm 10 is placed in the one end of the hollow cylindrical metal case 20 at the internal combustion engine 200 side, and the pressure sensing chip 40 is placed at the other end of the hollow cylindrical metal case 20, and the pressure transmission member 50 is placed at the hollow part of the hollow cylindrical metal case 20. In the configuration of the pressure sensor 100, the pressure sensing diaphragm 10 receives the combustion pressure P of the combustion chamber 202 of the vehicle, and the pressure transmission member 50 transmits the signal regarding the pressure P from the pressure sensing diaphragm 10 to the pressure sensing chip 40. This mechanism can detect the combustion pressure P of the internal combustion engine 200 of the vehicle.

In the configuration of the pressure sensor 100 according to the first embodiment of the present invention, an oil passage 60 through which oil W flows is formed in the hollow cylindrical metal case 20. This oil passage 60 is composed of a primary passage 61 formed in the inside of the side wall part of the hollow cylindrical metal case 20 and a secondary passage 62 formed in the inside of the side wall part of the hollow cylindrical metal case 20. Those primary and secondary passages are made by cutting or forging.

The primary and secondary passages 61 and 62 are communicatively connected to the hollow part of the hollow cylindrical metal case 20. The oil W flowing through the oil passage 60 is introduced from the primary passage 61 into the hollow part of the hollow cylindrical metal case 20, and then discharged through the secondary passage 62 to the outside of the pressure sensor 100, as clearly shown in FIG. 1.

In the embodiment of the present invention, the internal combustion engine 200 as the attaching member for the pressure sensor 100 is an automobile engine, and the oil W is the engine oil for the internal combustion engine 200. In general, the internal combustion engine 200 has an oil passage 203 through which the engine oil W flows, like the configuration of the internal combustion engines.

The hollow cylindrical metal case 20 is attached to the engine 200 described above. The engine oil W is introduced through the oil passage 203 to the primary passage 61 in the hollow cylindrical metal case 20. The engine oil W is then introduced from the primary passage 61 to the hollow part of the hollow cylindrical metal case 20, and returned to the oil passage 203 of the internal combustion engine 200 through the secondary passage 62.

In a concrete example, the hollow cylindrical metal case 20 is fixed to the cylindrical housing 30 through the end part of the distortion part 22 in the secondary case part 20b. There are various manners such as laser welding, resistance welding, plasma welding, electric beam welding, brazing, or soldering as the fixing manner between the hollow cylindrical metal case 20 and the cylindrical housing 30.

As described above, the cylindrical housing 30 is screwed to the internal combustion engine 200 by the screw part 31. The hollow cylindrical metal case 20 is attached to the internal combustion engine 200 through the cylindrical housing 30.

As shown in FIG. 1, an introduction passage 71 and a discharge passage 72 are formed in the cylindrical housing 30. Through the introduction passage 71, the oil W in the internal combustion engine 200 is pumped into the primary passage 61 of the hollow cylindrical metal case 20. Through the discharge passage 72, the oil W is discharged/returned from the secondary passage 62 of the hollow cylindrical metal case 20 to the internal combustion engine 200.

The introduction passage 71 and the discharge passage 72 are formed in the inside of the cylindrical housing 30 by cutting and casting. Both the introduction passage 71 and the discharge passage 72 formed in the cylindrical housing 30 have the openings formed at the lower end part and the upper part of the cylindrical housing 30 in order to joint both those openings through both the end parts of the cylindrical housing 30.

As shown in FIG. 1, the introduction passage 71 of the cylindrical housing 30 is joined to the primary passage 61 of the hollow cylindrical metal case 20 at the lower end part of the cylindrical housing 30 and joined to the oil passage 203 of the internal combustion engine 200 at the upper end part of the cylindrical housing 30 projecting from the internal combustion engine 200.

On the other hand, the discharge passage 72 of the cylindrical housing 30 is joined to the secondary passage 62 of the hollow cylindrical metal case 20 at the lower end part of the cylindrical housing 30. The discharge passage 72 of the cylindrical housing 30 is further joined to the oil passage 203 of the internal combustion engine 200 at the upper end part of the cylindrical housing 30 projected from the internal combustion engine 200. The shape of each of the primary passage 61, the secondary passage 62 of the hollow cylindrical metal case 20 and the shape of each of the introduction passage 71 and the discharge passage 72 of the cylindrical housing 30 are not limited. For example, they has a circular cross section passage (as shown in FIG. 2B), for example.

In addition, the cylindrical housing 30 is fixed to the hollow cylindrical metal case 20 by welding, so that any leakage of the oil W does not occur between the introduction passage 71 and the primary passage 61 and between the discharge passage 72 and the secondary passage 62.

The introduction passage 71 of the cylindrical housing 30 is joined to the oil passage 203 of the internal combustion engine 200 through an oil transmitting pipe member 81 for the oil which joins the cylindrical housing 30 to the internal combustion engine 200. The discharge passage 72 of the cylindrical housing 30 is joined to the oil passage 203 of the internal combustion engine 200 through the oil returning pipe member 82 which joins the cylindrical housing 30 to the internal combustion engine 200.

The oil transmitting pipe member 81 and the oil returning pipe member 82 are hoses made of metal, rubber, or resin having a superior thermal resistance capability.

The oil transmitting pipe member 81 and the oil returning pipe member 82 are joined to the cylindrical housing 30 of the pressure sensor 100 and the internal combustion engine 200, respectively, by screw connection in which the end parts of both the pipe members 81 and 82 are inserted into the cylindrical housing 30 and the internal combustion engine 200, respectively, and screwed, or pressed with the cylindrical housing 30 and internal combustion engine 200, respectively.

As shown in FIG. 1, in the pressure sensor 100 of the first embodiment of the present invention, the complete connection state can be achieved without leakage of oil between the oil passage 203 of the internal combustion engine 200, the oil transmitting pipe member 81, the introduction passage 71 of the cylindrical housing 30, the primary passage 61 and the secondary passage 62 of the hollow cylindrical metal case 20, the discharge passage 72 of the cylindrical housing 30, the oil returning pipe member 82, and the oil passage 203.

The oil W flowing through the oil passage 203 of the internal combustion engine 200 is branched to the oil transmitting pipe member 81 from the oil passage 203. The branched oil W passes the hollow part of the hollow cylindrical metal case 20 through the introduction passage 71 and the primary passage 61 of the oil passage 60. The branched oil W is returned from the secondary passage 62 of the oil passage 60 to the oil passage 203 of the internal combustion engine 200 through the discharge passage 72 and the oil returning pipe member 82.

The pressure sensor 100 having the configuration described above excluding the oil passage 60 of the hollow cylindrical metal case 20 and the introduction passage 71 and the discharge passage 72 of the cylindrical housing 30 can be manufactured by the same manner of manufacturing related art pressure sensors. In other words, in the manufacturing of the pressure sensor 100 according to the first embodiment of the present invention, the oil passage 60, the introduction passage 71, and the discharge passage 72 are formed in the hollow cylindrical metal case 20 and the cylindrical housing 30 in advance, and remaining components are manufactured by the same manner of manufacturing the related art pressure sensors.

As described above, the hollow cylindrical metal case 20 is composed of plural connection members, namely, the primary case part 20a and the secondary case part 20b connected together. The hollow part of the hollow cylindrical metal case 20 is a space surrounded by the primary case part 20a, the secondary case part 20b, and the pressure sensing diaphragm 10.

Accordingly, in the first embodiment of the present invention, it is required to connect the primary case part 20a to the secondary case part 20b, and to connect the hollow cylindrical metal case 20 to the pressure sensing diaphragm 10 by welding and the like without any leakage of the oil W.

After attaching or fastening the pressure sensor 100 to the internal combustion engine 200 by screw connection, the pressure sensor 100 is connected to the internal combustion engine 200 by another connection manner such as screw connection and pressing through the oil transmitting pipe member 81 and the oil returning pipe member 82. Thereby, the pressure sensor 100 having the attaching mechanism according to the first embodiment of the present invention shown in FIG. 1 is achieved.

The pressure sensor 100 is fixed to the internal combustion engine 200 by screw connection of the screw part 31 of the cylindrical housing 30. In this case, the oil transmitting pipe member 81 and the oil returning pipe member 82 are detached from the opening parts of each of the introduction passage 71 and the discharge passage 72 in the cylindrical housing 30 of the pressure sensor 100, and from the opening of the internal combustion engine 200 connected to the oil passage 203. After detaching the oil transmitting pipe member 81 and the oil returning pipe member 82, those openings are sealed by plugs by screw connection and pressing.

On operating the internal combustion engine 200 of the vehicle, the pressure sensor 100 starts its operation and detects the pressure P of the combustion chamber 202. At this time, the oil W flows through the oil passage 203 in the internal combustion engine 200. The thermal energy of the pressure sensor 100 received from the combustion chamber 202 of the internal combustion engine 200 can be discharged while flowing the oil W through the hollow cylindrical metal case 20 of the pressure sensor 100.

The pressure sensor 100 according to the first embodiment of the present invention, as described above in detail, the pressure sensing diaphragm 10 is placed at one end of the hollow cylindrical metal case 20, the pressure sensing chip 40 is placed at the other end of the hollow cylindrical metal case 20, and the pressure transmission member 50 is placed in the hollow part of the hollow cylindrical metal case 20. The pressure P detected by the pressure sensing diaphragm 10 is transferred to the pressure sensing chip 40. The pressure sensor 100 thereby outputs the signal corresponding to the pressure P detected.

The first embodiment provides the attaching mechanism in which the hollow cylindrical metal case 20 of the pressure sensor 100 is inserted and fixed into the attaching hole 201 formed in the internal combustion engine 200.

In the attaching mechanism of the first embodiment, the oil passage 60 is formed in the hollow cylindrical metal case 20 of the pressure sensor 100 in order to flow the oil W into the hollow part of the hollow cylindrical metal case 20, and the pressure sensor 100 is connected to the internal combustion engine 200 through the oil transmitting pipe member 81 and the oil returning pipe member 82. Through the oil transmitting pipe member 81, the oil W is transmitted from the internal combustion engine 200 to the oil passage 60, and through the oil returning pipe member 82, the oil W is returned from the oil passage 60 to the internal combustion engine 200. The oil W is transmitted from the internal combustion engine 200 as the attaching member and the oil supply source to the hollow cylindrical metal case 20. Having both the oil transmitting pipe member 81 and the oil returning pipe member 82 enables the thermal energy of the pressure sensing diaphragm 10 and the pressure sensing chip 40 to be discharged through the oil W.

According to the first embodiment of the present invention, it is possible to provide the pressure sensor 100 and the attaching mechanism of the pressure sensor 100 capable of efficiently decreasing the temperature of the pressure sensing diaphragm 10 and the pressure sensing chip 40.

As a result, even if the thermal energy of the combustion chamber 202 in the internal combustion engine 200 is added into the pressure sensing diaphragm 10 of the pressure sensor 100 exposed to the combustion chamber 202 as the target in measuring, it is possible to prevent the occurrence of distortion of the pressure sensing diaphragm 10, and also to prevent that the temperature of the pressure sensing chip 40 exceeds its operation allowable temperature by the thermal energy of the combustion chamber 202 of the internal combustion engine 200. It is further possible to decrease the detection error of the pressure sensor 100 as small as possible.

In the configuration of the pressure sensor 100 according to the first embodiment of the present invention, although the oil W is introduced in the hollow part of the hollow cylindrical metal case 20 through the primary passage 61 of the pressure sensor 100, and the oil W is discharged and returned to the internal combustion engine 200 through the secondary passage 62 of the pressure sensor 100, it is possible to switch the function of those primary passage 61 and the secondary passage 62, that is, the oil W is introduced through the secondary passage 62, and the oil W is then discharged through the primary passage 61. In this case, the passage at the left side shown in FIG. 1 acts as the primary passage 61 and the passage at the right side shown in FIG. 1 acts as the secondary passage 62. Further, the other components of the pressure sensor 100 such as the introduction passage 71 and the discharge passage 72 and the oil transmitting pipe member 81 and the oil returning pipe member 82 are switched to each other.

Further, according to the first embodiment of the present invention, in order to separate the pressure sensing chip 40 from the oil W, the pressure sensing chip 40 is placed at the outer surface of the other end of the hollow cylindrical metal case 20, namely, placed at the outer surface of the distortion part 22. The pressure P detected by the pressure sensing diaphragm 10 is transferred to the pressure sensing chip 40 by the pressure transmission member 50 and the distortion of the distortion part 22. This mechanism enables the pressure sensing chip 40 to be free from oil resistance capability.

Second Embodiment

A description will be given of the configuration of the pressure sensor 100-1 according to the second embodiment of the present invention with reference to FIG. 2A and FIG. 2B.

Figure 2A:
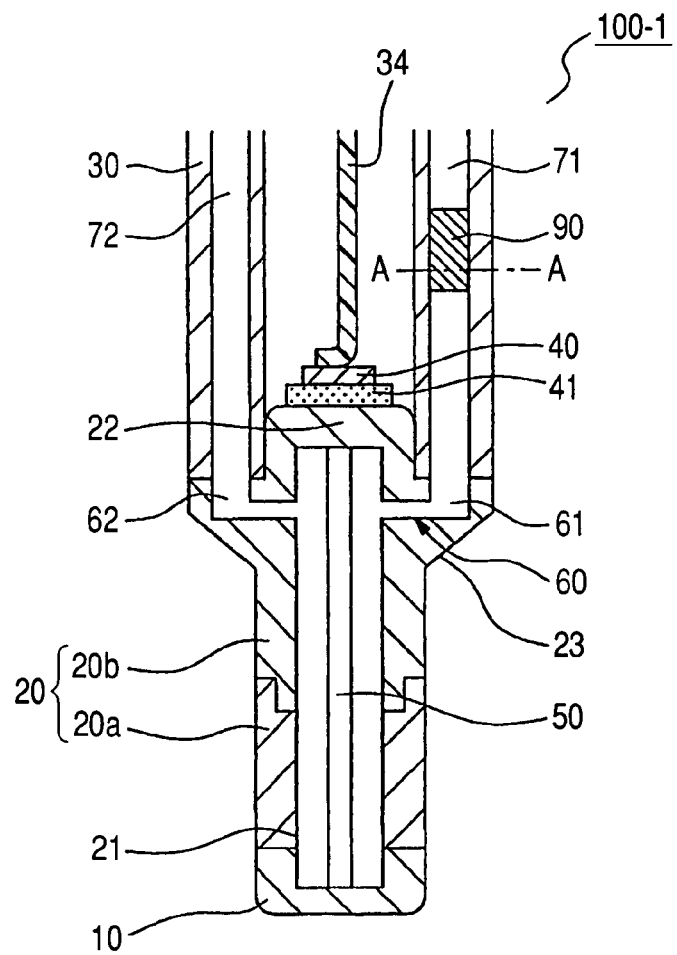
FIG. 2A is a schematic sectional view showing a main part of the pressure sensor according to a second embodiment of the present invention.
Figure 2B:
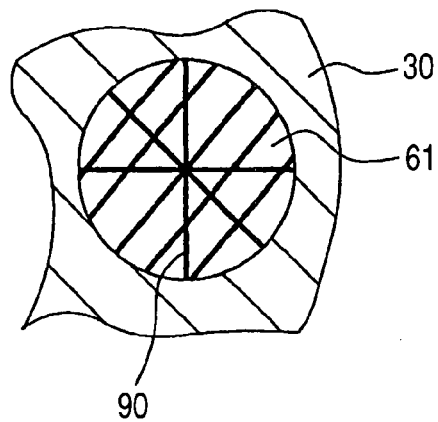
FIG. 2B is a schematic sectional view of a filter placed in an introduction passage in the main part of the pressure sensor, along the alternate long and short dash line A-A shown in FIG. 2A.

FIG. 2A is a schematic sectional view showing a main part of the pressure sensor 100-1 of the second embodiment. This main part is placed near the hollow cylindrical metal case 20. FIG. 2B is a schematic sectional view of a filter 90 placed in the main part of the pressure sensor 100-1 along the alternate long and short dash line A-A shown in FIG. 2A. That is, FIG. 2B shows a sectional view of the introduction passage 71 of the cylindrical housing 30 at the upstream of the primary passage 61 of the oil passage 60 in the pressure sensor 100-1. Other components of the pressure sensor 100-1 of the second embodiment are the same of those of the pressure sensor 100 of the first embodiment shown in FIG. 1, and therefore the explanation of the same components are omitted here.

As shown in FIG. 2A and FIG. 2B, a filter 90 is placed in the introduction passage 71 of the cylindrical housing 30 positioned at the upstream side of the primary passage 61 of the oil passage 60. The filter 90 is capable of filtering the oil W. As shown in FIG. 2B, the introduction passage 71 has a circular cross section shape.

The filter 90 is a mesh type filter, such as an engine oil filter for a vehicle, as shown in FIG. 2B, made of resin, metal, and ceramic.

The filter 90 in inserted into the introduction passage 71 through its opening by jig or working tool in order to place the filter 90 in the introduction passage 71.

According to the second embodiment of the present invention, it is possible to provide the pressure sensor 100-1 having the same function of the pressure sensor 100 of the first embodiment. Further, because the filter 90 filters the oil W before supplying the oil W into the hollow part of the hollow cylindrical metal case 20, it is possible to eliminate dust and metal powder in the oil W before supplying it to the hollow part of the hollow cylindrical metal case 20.

Other Modifications

In the first and second embodiments of the present invention described above, the hollow cylindrical metal case 20 is composed mainly of the primary case part 20a of a cylindrical shape and the secondary case part 20b of a cylindrical shape which are joined together. The present invention is not limited by this joined type of the hollow cylindrical metal case 20. For example, it is possible to have a single body having the function of the primary case part 20a and the secondary case part 20b unless it has a hollow cylindrical shape. Further, it is possible to have a single body assembled by the hollow cylindrical metal case 20 and the pressure sensing diaphragm 10.

Further, in the first and second embodiments of the present invention, the hollow cylindrical metal case 20 is fixed to the cylindrical housing 30, and the pressure sensor 100 is fixed to the internal combustion engine 200 as the attaching member through the cylindrical housing 30. However, the present invention is not limited by this configuration. For example, it is possible to have another configuration in which the hollow cylindrical metal case 20 is directly connected or attached to the attaching hole 201 of the internal combustion engine 200. In this case, it is possible to circulate the oil W between the internal combustion engine 200 and the pressure sensor when the oil passage 60 of the hollow cylindrical metal case 20 is joined to the oil passage 203 of the internal combustion engine 200 by using the pipe member such as the oil transmitting pipe member 81 and the oil returning pipe member 82 in the configuration of the pressure sensor according to the first embodiment.

Further, the joint configuration between the oil passage 203 of the internal combustion engine 200 and the oil passage in the pressure sensor 100 does not use separate passages such as the oil transmitting pipe member 81 and the oil returning pipe member 82. For example, it is possible to adopt the oil pipe configuration in which an oil supply passage from the oil passage 203 to the attaching hole 201 is formed in the inside of the internal combustion engine 200 by a cutting process in order to introduce the oil W into the pressure sensor 100. In this case, the openings of the introduction passage 71 and the discharge passage 72 are formed in the outer surface of the cylindrical housing 30 positioned at the attaching hole 201 in order to circulate the oil W between the pressure sensor 100 and the oil supply passage joined to the oil passage 203.

By the way, the sensing unit capable of generating the detection signal based on the pressure P is the pressure sensing chip 40. It is possible to use another type of a sensing unit such as an electric capacitance type sensor capable of generating a signal corresponding to the pressure transferred from the pressure transmission member 50, instead of the pressure sensing chip 40.

It is possible to use another type of the attaching part to be fixed to the attaching hole 201 by pressing, instead of the screw part 31.

In each of the embodiments, although the pressure transmission member 50 is a rod shape member, the present invention is not limited by this configuration. It is possible to use another type member having a spherical shape, an eccentric spherical shape, or a drum shape unless it is capable of being placed in the hollow part of the hollow cylindrical metal case 20 and capable of transmitting the pressure P.

Still further, in each embodiment, the engine 200 is a vehicular engine and the oil W is engine oil. The present invention is not limited by this, for example, it is possible to use another type of oil such as brake oil of a vehicle unless it has a high temperature resistance. In this case, an oil passage is formed in an engine head in the engine 200, through which the brake oil flows, and the brake oil is introduced from the above passage of the brake oil to the pressure sensor 100 through the oil transmitting pipe member 81 and the oil returning pipe member 82, like the configurations of the first and second embodiments.

In each embodiment described above, although the oil W is supplied from the internal combustion engine 200 as the attaching member to the oil passage 60 in the pressure sensor 100, it is possible to use another oil source other than the attaching member. For example, it is possible that the pressure sensor 100 has an oil supply source such as an oil tank and an oil circulation pump.

The pressure sensor according to the present invention is applied to the combustion pressure sensor and is attached to the internal combustion engine 200. The concept of the present invention is not limited by those cases. For example, the pressure sensor according to the present invention is applicable to various types of pressure sensors, in particular, to a pressure sensor composed of a pressure sensing diaphragm and a sensing unit such as a temperature sensing unit for use under a high temperature environment so far as it can be inserted and attached to an attaching member through its attaching hole.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A pressure sensor comprising:
   a hollow cylindrical metal case having a hollow part in which an oil passage is formed;
   a pressure sensing diaphragm, placed at one end of the hollow cylindrical metal case, distorted by receiving a pressure;
   a pressure sensing unit placed at the other end of the hollow cylindrical metal case; and
   a pressure transmission member, placed in the hollow part of the hollow cylindrical metal case, through which the pressure detected by the pressure sensing diaphragm is transmitted to the pressure sensing unit, wherein thermal energy of the pressure sensing diaphragm and the pressure sensing unit is radiated through an oil which flows in the oil passage.

2. The pressure sensor according to claim 1, wherein the oil passage comprises a primary passage and a secondary passage placed in the inside of a side wall part of the hollow cylindrical metal case and communicatively connected to the hollow part of the hollow cylindrical metal case, and the oil is introduced from the primary passage into the hollow part, and the oil is discharged from the hollow part to the secondary passage.

3. The pressure sensor according to claim 2, wherein the hollow cylindrical metal case is attached to an attaching member in which the oil flows, and the oil is supplied from the attaching member into the hollow part of the hollow cylindrical metal case through the primary passage, and the oil is returned to the attaching member from the hollow part of the hollow cylindrical metal case through the secondary passage.

4. The pressure sensor according to claim 3, wherein the hollow cylindrical metal case is fixed to a housing at the other end of the hollow cylindrical metal case, and the pressure sensor is attached to the attaching member through the housing, and the housing comprises an introduction passage and a discharge passage, in which the oil in the attaching member is supplied into the primary passage through the introduction passage, and the oil is returned to the attaching member from the secondary passage through the discharge passage.

5. The pressure sensor according to claim 1, further comprising a filter, placed at an upstream side of the oil passage, capable of filtering the oil before the oil reaches the hollow part.

6. The pressure sensor according to claim 2, further comprising a filter, placed at an upstream side of the primary passage, capable of filtering the oil.

7. The pressure sensor according to claim 1, wherein the attaching member is an internal combustion engine, and the oil is an engine oil of the internal combustion engine.

8. An attaching mechanism of a pressure sensor comprising: a hollow cylindrical metal case; a pressure sensing diaphragm, placed at one end of the hollow cylindrical metal case, distorted by receiving a pressure; a pressure sensing unit placed at the other end of the hollow cylindrical metal case; a pressure transmission member, placed at a hollow part of the hollow cylindrical metal case, transmitting the pressure detected by the pressure sensing diaphragm to the pressure sensing unit; and an attaching member in which the oil flows, wherein the pressure sensor is attached and fixed to the attaching member by inserting the hollow cylindrical metal case of the pressure sensor into an attaching hole formed in the attaching member, and wherein the hollow cylindrical metal case has an oil passage through which an oil flows, an oil transmitting pipe member and an oil returning pipe member are formed between the attaching member and the pressure sensor, in which the oil is transmitted to the oil passage through the oil transmitting pipe member, and the oil is returned to the attaching member from the oil passage through the oil returning pipe member, and thermal energy of the pressure sensing diaphragm and the pressure sensing unit is radiated through the oil flowing from the attaching member to the hollow part through the oil transmitting pipe member and the oil passage, and through the oil flowing from the hollow part to the attaching member through the oil passage and the oil returning pipe member.

9. The attaching mechanism according to claim 8, wherein the oil passage comprises a primary passage and a secondary passage, which are placed in the inside of a side wall part of the hollow cylindrical metal case communicatively connected to the hollow part of the hollow cylindrical metal case, and the oil is introduced from the primary passage into the hollow part, and the oil is discharged from the hollow part to the secondary passage.

10. The attaching mechanism according to claim 9, wherein the hollow cylindrical metal case is fixed to the housing at the other end of the hollow cylindrical metal case, and the pressure sensor is attached to the attaching member through the housing, the oil transmitting pipe member and the oil returning pipe member are connected between the housing and the attaching member, and the housing comprises an introduction passage and a discharge passage, in which the introduction passage is connected between the oil transmitting pipe member and the primary passage, and the discharge passage is connected between the secondary passage and the oil returning pipe member.

11. The attaching mechanism according to claim 8, further comprising a filter, placed at an upstream side of the oil passage, capable of filtering the oil before the oil reaches the hollow part of the hollow cylindrical metal case.

12. The attaching mechanism according to claim 9, further comprising a filter, placed at an upstream side of the primary passage, capable of filtering the oil.

13. The attaching mechanism according to claim 8, wherein the attaching member is an internal combustion engine, and the oil is an engine oil of the internal combustion engine.

* * * * *